United States Patent
Lee (10) Patent No.: US 12,335,258 B2
(45) Date of Patent: Jun. 17, 2025

(54) SYSTEM AND RELATED METHODS FOR EFFICIENTLY PROVIDING RESOURCES AND TECHNOLOGY TO REMOTELY WORKING EMPLOYEES

(71) Applicant: Acceliris, LLC, Louisville, KY (US)

(72) Inventor: John D. Lee, Louisville, KY (US)

(73) Assignee: ACCELIRIS, LLC, Louisville, KY (US)

( * ) Notice: Subject to any disclaimer, the term of this patent is extended or adjusted under 35 U.S.C. 154(b) by 240 days.

(21) Appl. No.: 17/890,826

(22) Filed: Aug. 18, 2022

(65) Prior Publication Data

US 2023/0058393 A1 Feb. 23, 2023

Related U.S. Application Data

(60) Provisional application No. 63/234,521, filed on Aug. 18, 2021.

(51) Int. Cl.
*G06F 21/00* (2013.01)
*H04L 9/40* (2022.01)

(52) U.S. Cl.
CPC ........ *H04L 63/0861* (2013.01); *H04L 63/102* (2013.01)

(58) Field of Classification Search
CPC .......................... H04L 63/0861; H04L 63/102
See application file for complete search history.

(56) References Cited

U.S. PATENT DOCUMENTS

| | | | |
|---|---|---|---|
| 10,079,820 B2* | 9/2018 | Kolli | G06F 21/41 |
| 2007/0237336 A1* | 10/2007 | Diethorn | H04R 1/1083 |
| | | | 381/74 |
| 2010/0186072 A1* | 7/2010 | Kumar | H04L 9/3231 |
| | | | 345/3.1 |
| 2013/0138810 A1* | 5/2013 | Binyamin | G06F 9/5072 |
| | | | 709/225 |
| 2014/0201527 A1* | 7/2014 | Krivorot | G06F 21/6209 |
| | | | 713/168 |
| 2015/0280759 A1* | 10/2015 | Cohen | H04B 1/12 |
| | | | 375/346 |
| 2019/0190997 A1* | 6/2019 | Sabeur | H04L 65/1104 |
| 2021/0136041 A1* | 5/2021 | Foxhoven | H04L 63/0876 |

* cited by examiner

*Primary Examiner* — Michael M Lee
(74) *Attorney, Agent, or Firm* — Stites & Harbison, PLLC; Terry L. Wright (57) ABSTRACT

A computer implemented method comprising instructions stored on a non-transitory computer-readable storage medium and executed on a computing device having a processor and a memory for authentication of an Office as a Subscription (OaaS) service is provided. The method includes receiving a request from a user via the computing device for accessing the OaaS service from a server via an existing network. The method further includes verifying one or more access credential requirements associated with the user and upon verification, providing the user remote access to the OaaS service from the server. The method also includes allowing the user to manipulate data in the OaaS service and storing the manipulated data in the server.

16 Claims, 4 Drawing Sheets

SYSTEM AND RELATED METHODS FOR EFFICIENTLY PROVIDING RESOURCES AND TECHNOLOGY TO REMOTELY WORKING EMPLOYEES

This application claims the benefit of U.S. Provisional Patent Application Ser. No. 63/234,521, filed on Aug. 18, 2021, the entire disclosure of which is incorporated herein by reference.

TECHNICAL FIELD

The present disclosure relates to network systems for providing high-performance dispersed workforce services and related methods of using said systems to allow employees in remote work spaces to access data securely via a subscription-based service. In particular, the present disclosure relates to a subscription-based service utilizing an Office as a Subscription (OaaS) service platform to modify an existing system such that companies and/or employers are provided with the resources and technology to efficiently and safely allow their employees to work remotely from home. The OaaS service platform minimizes security risks, while also providing the tools, software, Information Technology (IT) equipment, and furniture for a fully customized office space.

BACKGROUND

The COVID-19 pandemic created a number of unique challenges, such as changing how corporate entities, businesses and other employers accomplish certain work tasks and where those works tasks are being accomplished. Specifically, these entities were and continue to be forced to consider the health and safety of their employees, while still operating efficiently and remaining productive for their clients and shareholders.

To balance these competing objectives, much of corporate America became known as a "dispersed" workforce, i.e., where a large number of employees work remotely to comply with "stay at home" government mandates and the like and/or to minimize the risk of catching and transmitting the infectious disease during the height of the pandemic. These employees almost immediately began working from home using personal computers and other equipment to access their employer's database and applications to perform their duties. While a number of employees are no longer required to work remotely, many employees continue to find it more convenient, comfortable, and safe to work from home. As a result, some employers are attempting to accommodate these employees by continuing to provide a work remote option.

Although allowing employees to work remotely was and remains a logical solution for advancing the goal of minimizing the employees' risk of contracting and transmitting infectious diseases like COVID-19 to others, it created and continues to create other challenges to both employers and employees. For example, employees working remotely for extended periods of time often need additional resources and technology to make the home environment a more secure, professional, efficient, and comfortable venue to perform the tasks that would otherwise be accomplished in an office setting. Generally, employees need office related equipment, such as chairs, filing cabinets, desks, noise-canceling technology and devices and privacy screens to create a suitable and professional working environment. Furthermore, employees typically need additional technological equipment, such as computing devices and related equipment, necessary computer hardware and software, printers, webcams, headsets, and the like.

In addition to the equipment required to enable the home user environment for working remotely, employers are exposed to extreme risks related to data theft, hacking, security threats and other IT problems with respect to a dispersed employee workforce. It is well known that it is more challenging for employers and their IT departments to monitor and control the security and technology of an employee's home office versus technology utilized within the company's office setting. Typically, employees access their employer's database and application via a Virtual Desktop Interface or VDI. Although VDI is rather secure, it potentially allows for employees to download and save sensitive information on their home computer, print or share said information at will, which is problematic for obvious reasons, namely, the risk of data theft and increased security risks.

A number of concerns surround the use of home user's devices, such as who has access to them, how employer information is accessed and the health, support, and maintenance of the home devices. A frequently asked question to employees working remotely is: "What happens when you leave your home-based workspace to run errands or take showers or tend to other personal or professional business?" In one poll, 95% of respondents stated they leave their system wide open without logging off during work interruptions and breaks, which provides an open system to anyone that has access to the employee's work station, i.e., anyone living or visiting in the employee's residence or workspace. Any company that must comply with certain government privacy laws or regulations, such as Health Insurance Portability and Accountability (HIPAA), Service Organization Control ("SOC"), Professional Services Automation ("PSA"), Payment Card Industry ("PCP") or Graham-Leach-Bliley ("GLB") would not meet compliance standards under these conditions.

Accordingly, there remains a need in the art for a subscription-based service to minimize security risks and ensure compliance with all data and security regulations associated with employees working remotely from the office to comply including internal IT policies and government privacy laws, while streamlining and providing the equipment, tools, and technology essential to meet all the needs of these home-based employees such that they may work professionally and productively.

SUMMARY

In accordance with one aspect of the disclosure, a computer implemented method comprising instructions stored on a non-transitory computer-readable storage medium and executed on a computing device having a processor and a memory for authentication of an Office as a Subscription (OaaS) service is provided. The method includes receiving a request from a user via the computing device for accessing the OaaS service from a server via an existing network. The method further includes verifying one or more access credential requirements associated with the user and upon verification, providing the user remote access to the OaaS service from the server. The method also includes allowing the user to manipulate data in the OaaS service and storing the manipulated data in the server.

In one embodiment, the server is a remote server. The remote server may be positioned behind a firewall or other secured data center. In another embodiment, the existing network is a cloud-based network.

In another embodiment, the one or more access credential requirements includes utilizing a biometric technology screening process. The biometric technology screening process may be a fingerprint scan.

In yet another embodiment, the method includes providing the computing device with a zero client technology unit. The method also includes preventing, by the zero client technology unit, any capturing, downloading or saving by the first device of the data from the server.

In still yet another embodiment, the method includes providing the computing device with a thin client technology unit. The method also includes preventing, by the thin client technology unit, any capturing, downloading or saving by the first device of the data from the server.

In accordance with another aspect of the disclosure, a computer implemented method for securely allowing one or more end users remote access to a server is provided. The method includes receiving, at a cloud-based network system, from a first device associated with the one or more end users, a request for access to the host server. The method also includes verifying one or more attributes of the one or more end users. The method further includes after successful verification, accessing data at the server, processing of the data at the server, and providing an output of information related to the processed data to the first device.

In one embodiment, the method includes the step of storing the output of information at the network system. In another embodiment, the method includes viewing, at the first device, the output of information related to the processed data.

In yet another embodiment, the method provides that the verifying step includes providing an fingerprint scanner to the first device to confirm an identity of the one or more end users.

In still yet another embodiment, the method includes providing an Office as a Subscription (OaaS) service on the cloud-based network system.

In accordance with yet another aspect of this disclosure, a system configured to allow an end user to work remotely from a host server on a computing device is provided. The system includes an Office as a Subscription (OaaS) service executing on a cloud-based network. The OaaS service is configured to: (i) establish a secure connection between the first computing device and the host server; (ii) access data at the host server; (iii) allow processing of the data solely at the host server; and (iv) provide an output of information related to the processed data to the first device.

In one embodiment, the computing device includes a biometric technology screening process to confirm an identity of the at least one end user. The computing device may also include at least one noise-cancelling element. The at least one noise-cancelling element may be a software patch configured to be added to a microphone of the computing device and/or an external port replicator having noise cancelling technology embedded therein.

In another embodiment, the system may include a storage area network (SAN) for saving any modifications to the processed data.

DESCRIPTION OF EXEMPLARY EMBODIMENTS

In the following detailed description, reference is made to the accompanying drawings and photographs that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a system or platform (known as HomeWerx™) that provides both employers and employees with the equipment, technology and security to thrive in a remote work environment is hereinafter described.

Figure 1:
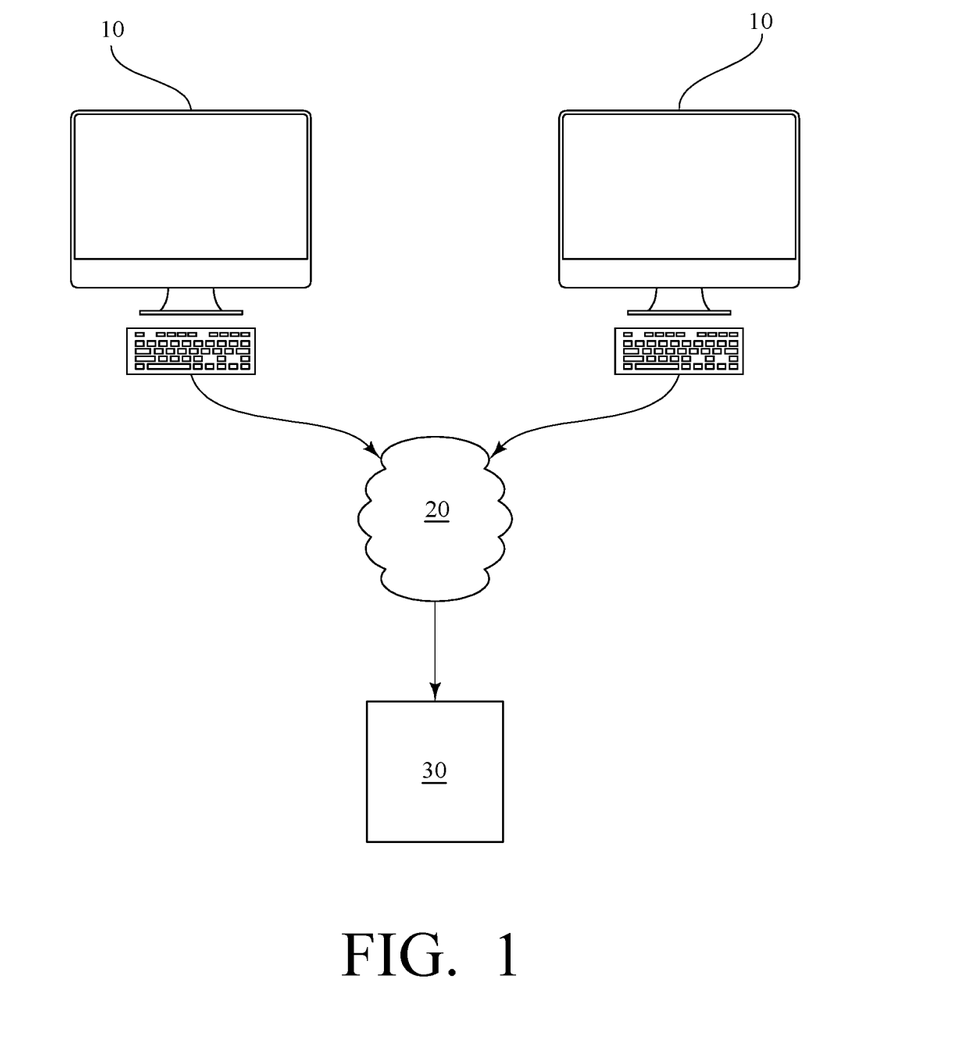
FIG. 1 is a block diagram showing a network environment including multiple end user devices in communication with a network server in accordance with the presently-disclosed subject matter.

As shown in FIG. 1, one particular embodiment of a network environment is illustrated. The network environment includes one or more end users, each associated with a device 10, such as a desktop computing unit or a mobile computing device. The devices 10 are in communication to at least one remote host server 30 via an existing network 20. It should be appreciated that the at least one remote host server may be accessed by multiple end users, i.e., employees. As shown in FIG. 1 (and FIG. 2 described in more detail below), two devices are illustrated in this embodiment, but it should be appreciated that an entire workforce for a company may be in communication to the same server via the same existing network.

Figure 2:
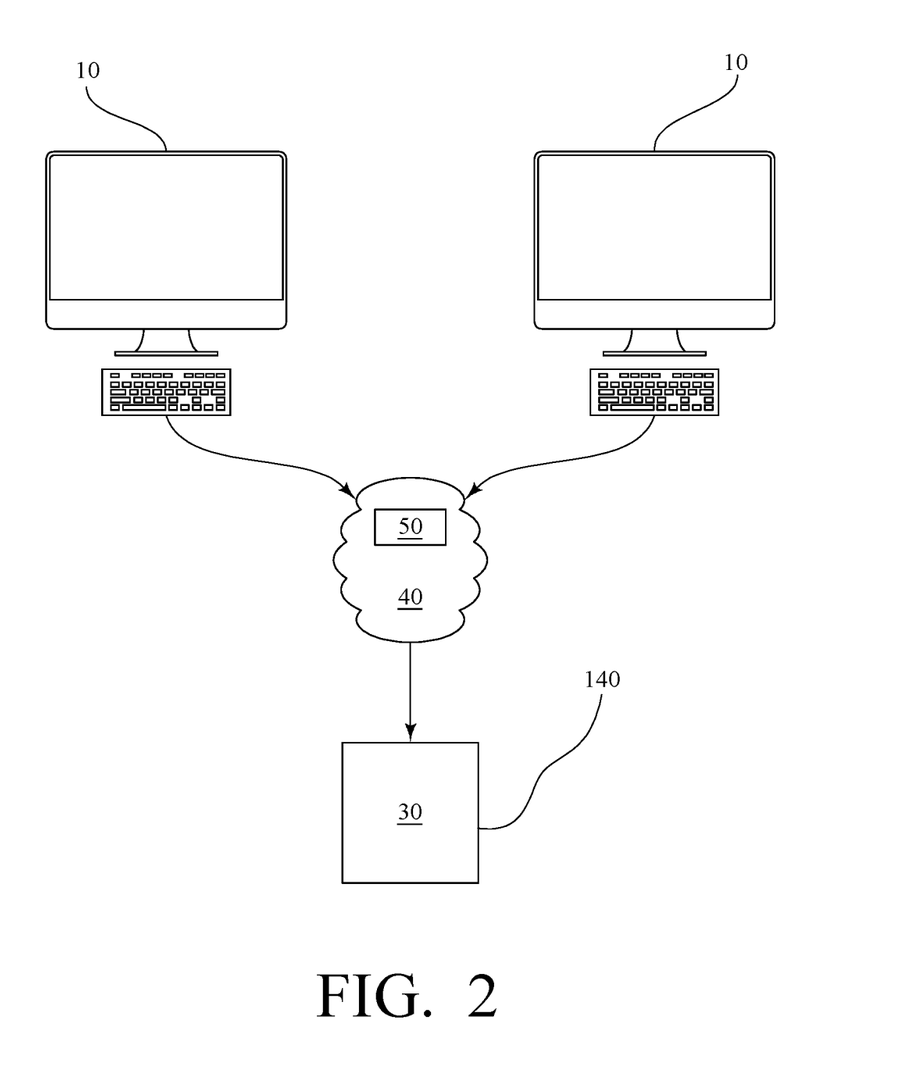
FIG. 2 is a block diagram showing a cloud environment including multiple end user devices in communication with a cloud service provider in accordance with the presently-disclosed subject matter.

Turning to FIG. 2, an embodiment of a cloud computing environment or network is illustrated. The cloud computing environment may include one or more end users, each associated with a device 10, such as a computing unit. The devices 10 and the remote server 30 are connected via a network 40, such as a cloud-based network. The cloud-based network 40 may include a cloud based delivery platform, such as "Office as a Subscription" (OaaS) service platform 50. The remote server 30 may be positioned behind a firewall 140 or other secured data center.

With respect to the novel OaaS offering disclosed herein, it follows similar guidelines as Software as a Service (SaaS) platform. In a SaaS model, software is deployed over the Internet and/or is deployed to run behind a firewall on a local area network or personal computer. With a SaaS model, a provider licenses an application to customers either as a service oil demand, through a subscription, a "pay-as-you-go" model or at no charge. This approach to application delivery is part of the utility computing model where all the technology is hosted on a "cloud" managed by a service provider and accessed over the Internet as a service.

Similarly, the system 60 offering of the OaaS platform 50 may be offered under any of these models. However, the preferred embodiment involves offering the OaaS platform 50 under a subscription-based service catering to home-based employees for corporate entities or employers. Employees working from home need certain resources and technology to make the home environment a more secure, professional, efficient, and comfortable venue to complete daily tasks they would otherwise do in an office setting provided by their employer. The goal of the OaaS platform is to improve efficiencies and minimize security threats to the home-based corporate user/employee, while providing a professional look and feel that companies desire.

The system 60 may come in multiple, different configurations that are fully customizable to the needs of the particular employer, employee, or work environment. The customizable packages are designed to provide a standardized, professional image of the employee to the outside world regardless of where the employee is actually working. The customizable packages are further designed to provide everything your company needs for its employees to work productively from home while minimizing risks, such as data theft, hacking, security threats and other IT problems.

Figure 3:
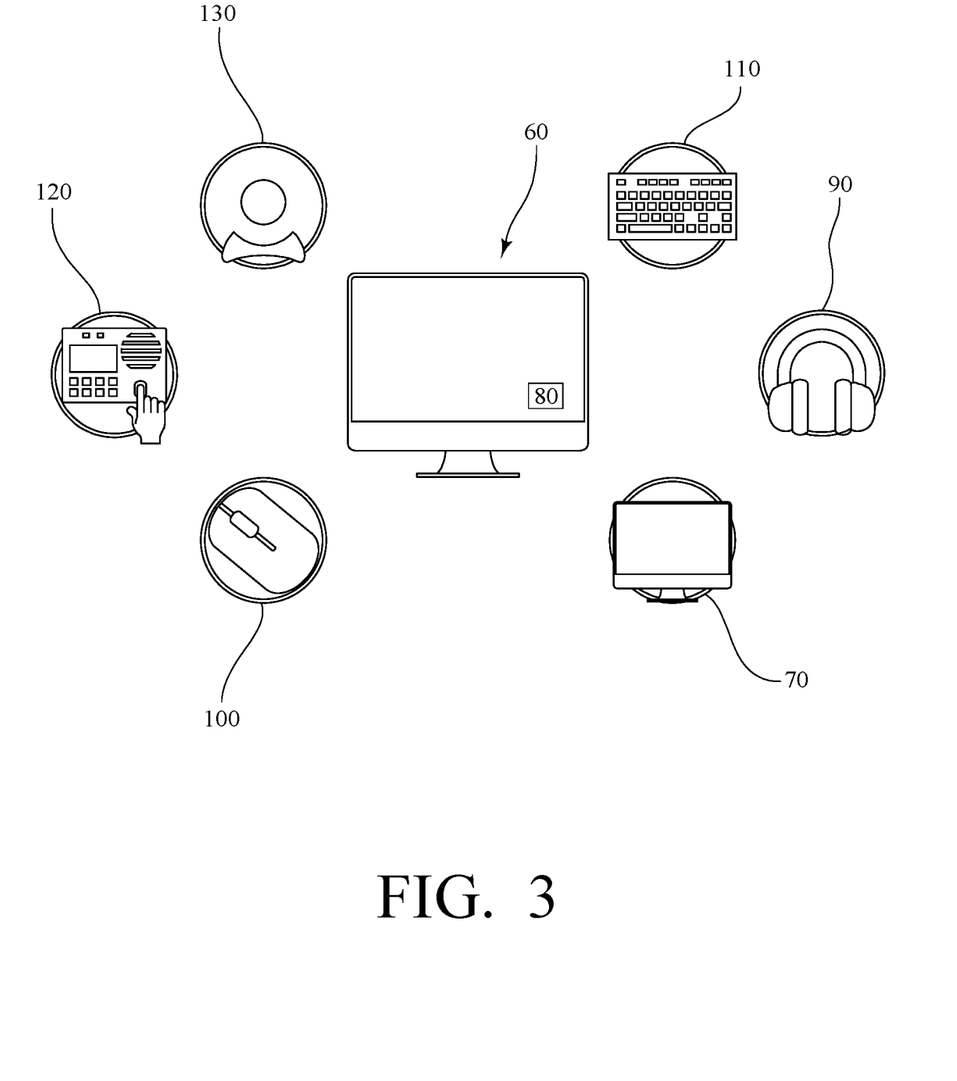
FIG. 3 is a schematic diagram showing various interconnected elements of the system in accordance with the presently-disclosed subject matter.
Figure 4:
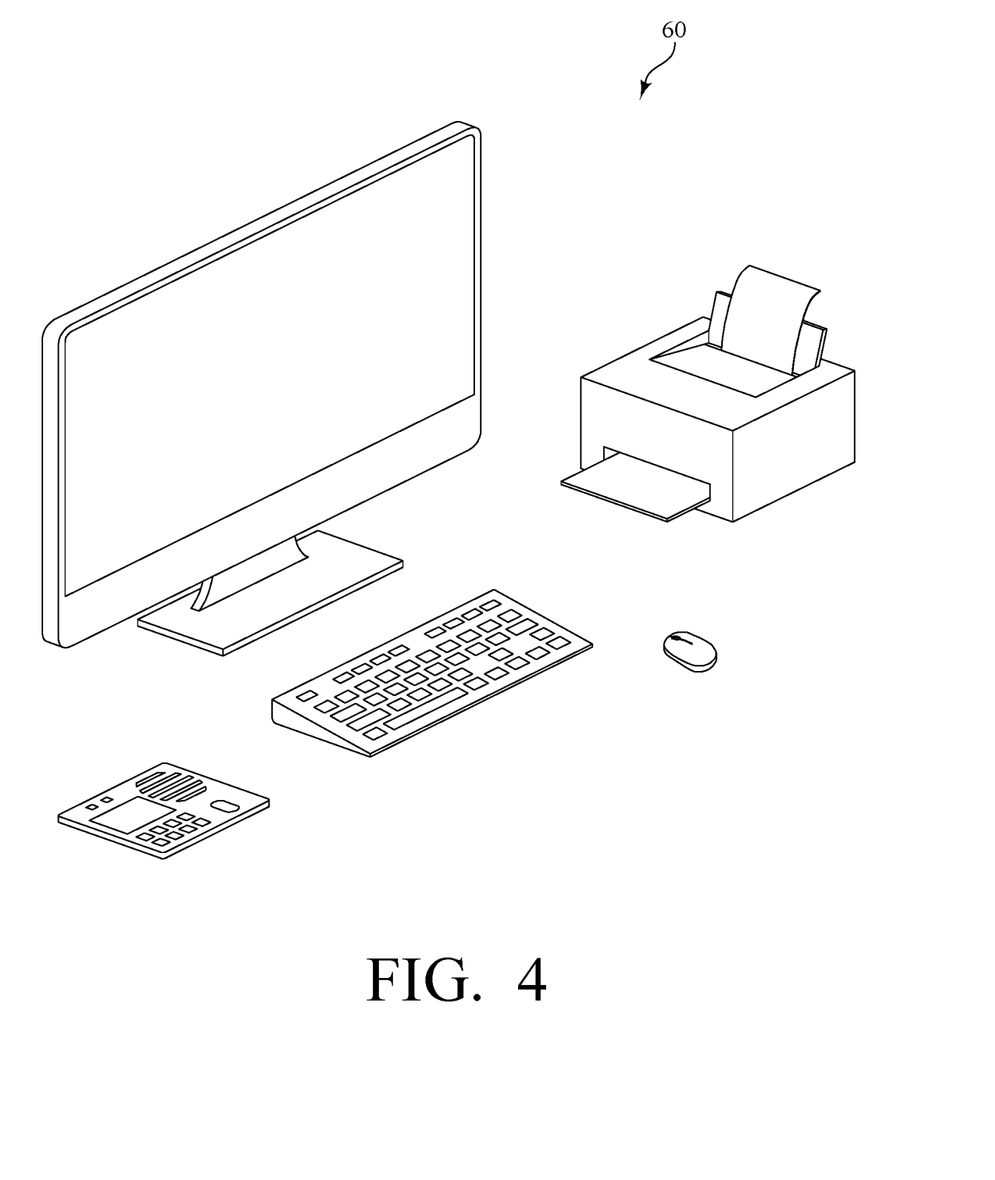
FIG. 4 is a schematic diagram showing a representative customized home office system in accordance with the presently-disclosed subject matter.

In one particular embodiment illustrated in FIG. 3, the "all-in-one" unit includes a monitor 70 with a "Thin Client" or "Zero Client" technology unit 80 (discussed in more detail below) built into it. The "all-in-one" unit may include: audio headset or headphones 90; mouse 100; keyboard 110; fingerprint scanning device 120; video camera 130; operating system including all necessary software used to access and run the unit with add-on software such as a suite of certain products; videoconferencing and/or teleconference software including webcam access subscriptions; browser; virtual desktop interface license; and access device for configuring and monitoring network. A representative home office system including a customized system is illustrated in FIG. 4.

It should be appreciated that the "all-in-unit" unit is completely customizable according to the needs and preferences of the employee and different products may be used with the unit. In one particular embodiment, the monitor may be a 34-inch LED monitor. The unit may be further equipped with: a Logitech video camera; Windows 10 operating system; Microsoft Office 365 Suite of products; Zoom, Microsoft Teams, Webex or Around Teleconferencing software; and Aruba AP 503 access device.

In another embodiment, the system includes a laptop computing device with: a 34-inch ultra-wide monitor; Microsoft Office 365 Enterprise E3 with Teams; Logitech Logi Dock with noise cancellation; Logitech audio headset; Logitech keyboard with numeric keypad; Logitech mouse and mouse pad; Biotech Fingerprint Scanning Device; Meeami ClearVoice noise cancellation; ergonomic desk or standing desk; ergonomic chair; locking file cabinet; 24-hour technology support; and all software to access and run the unit and add-on software, such as webcam access subscriptions. In addition, the following options are available, including printer and printer cable, Aruba access point, and any miscellaneous items requested by the employee or employer. Of course, it should be emphasized that the operating system, equipment and brands mentioned herein are merely offered as representative examples and are not intended to be limiting and other operating systems, equipment and brands as the system is fully customizable.

In addition to the elements included in above-described embodiment, other optional elements are available, such as privacy screens for open area home office environments, printers, phones, noise-cancelling technology and devices, such as headphones, sound masking systems and add-on software/patches to eliminate/decrease any background noise in the particular remote environment, professional lighting for video meetings and other miscellaneous items requested by employee or employer. Noise-cancelling devices are especially important in a remote work setting because the employee may not be confined within a standard office. For example, the employee may be working in an open room at their house and subject to noises from other members of the family or household appliances. Noise-cancelling technology improves the employee's focus, accuracy and stress level and, thus, increase the overall production in the remote office space.

In one particular embodiment, the noise-cancelling technology may be a software patch, such as the one provided by Meeami Technologies. The software patch may be added to the microphone of the computing device to provide noise cancellation while on teleconference or videoconference calls. In addition, an external port replicator having noise cancelling technology embedded therein may be added to the system to either enhance and/or act as backup to the software patch.

Remotely working employees may also need office related equipment, such as ergonomic or standing desks and chairs, filing cabinets, etc. This equipment may be provided as part of the subscription and may be constructed by Fully, a subsidiary of Knowles Furniture (recently acquired by the Herman Miller furniture company) or some other furniture company. The desk may be configured to the needs of the employee/end user, such as a height adjustable desk that can be programmed for sitting or standing. With a single touch of a button, the desk may adjust to the comfort level selected via a user input connected to the system. The desk may have a plurality of different settings. In one particular embodiment, the desk has the following dimensions (27×60) and is known as a "whiteboard" desk, wherein the desk can be written on using dry erase marking utensils. The furniture may include "white glove" delivery and set up to the employee's home or work space.

Importantly, the system 60 comes with an around the clock security monitoring and technical support, i.e., a help desk offering around the clock (24×7) assistance. Any technical issue that arises may be handled by the HomeWerx™ support team or a contracted third party. If any component of the system or technology unit 80 malfunctions or otherwise needs maintenance, repair or replacement, the employee/end user will either be shipped a new unit via express shipping or can expect a service technician at their home within hours to diagnose and repair the issue or provide/order replacement equipment.

As mentioned above, the system includes a "Thin Client" or "Zero Client" technology unit 80 that lives in a virtual machine that can be configured to prevent the end user from capturing, downloading or saving any company data or information. Both Thin Client and Zero Client are typically utilized for the same purpose, i.e., high-performing endpoints that connect to a remote device and manage a centralized computing infrastructure. Unlike traditional personal computers (also known as a Fat Client or Thick Client), the technology unit 80 does not perform any processing itself. Rather, all processing takes place on the server side (not the end user side) to minimize security risks. Both technologies are easy to set up and use and require little to no updates and configuration is not needed. Thin and Zero Client technology allows the employer to focus solely on improving business and not worry about clutter. The employer is able to store their data and applications on a central server using these high-performance endpoints that give them all the benefits of a personal computer, but with added security, more powerful connectivity, seamless hardware/software upgrades and cutting-edge functionality.

In more detail, Zero Client is a server-based cloud computing model, wherein the end user's (i.e., the remotely working employee in this case) computing device has no local storage because it has no local operating system or hard drive. Instead, virtual desktop infrastructure (VDI), workspaces and computer power reside on networked servers. As long as the employee/end user has network access, they should have consistent and reliable internet access, lower power consumption and a standardized computing experience on any desktop, laptop, tablet or other mobile computing device. Advantageously, Zero Client enhances security by reducing risk to security vulnerabilities, like viruses and malware.

Although similar to Zero Client in ways outlined above, Thin Client may have a minimal operating system and each device's specific configuration settings may be retained in a flash memory (although the majority of data from a Thin Client is still stored on a remote server). Typically, with Thin Client, employees can access virtual desktop environments that are centrally stored and managed in the data center, which offers a safe working environment while providing users with access to applications from any location and device.

As a result, Zero Client devices are more secure because there is no operating system to infect, and there is no data stored on the individual device. Also, with Zero Client, the end users are unable to install unauthorized or potentially infected software, cannot accidentally delete system files, or copy sensitive data to flash drives. By dramatically reducing the risk of virus or malware attack, the Zero Client can decrease overall downtime.

In this case, the technology unit 80 merely securely accesses the employer's data and allows the processing to take place at the host server of the corporate office. Once the processing step is complete at the host server, it provides an output of information to the home-based employee. Any additions, deletions or modifications made to the company database is saved on corporate system hard drive devices called Storage Area Networks (SAN). As a result, the corporate servers and storage devices are largely protected from security risks such as computer viruses, worms, or Ransomware attacks.

Generally, Ransomware attacks are considered the greatest threat to all companies processing data to their customers. Advantageously, the technology unit 80 utilizes no built in hard drive and, therefore, private and sensitive company data is not saved on the device, which eliminates the possibility of data being downloaded by employees off-site, as well as virus and Ransomware attacks. Since the technology unit is configured such that the home office user/employee cannot capture, download or save any sensitive company or client information that may violate company policy or government privacy laws, such as HIPAA, SOC, PSA, PCI or GLB, the company's risk in inadvertently sharing sensitive information or violating federal law is minimized. Furthermore, endpoint protection is provided because there is zero attack surface, an unpublished application programming interface (API) and encrypted data, which further minimizes any virus attacks and is malware resistant. Because the data is kept safely in the cloud, compliance management and IP protection is simplified while reducing risk of data loss and theft.

In addition, the system solves the problem discussed above regarding employees leaving their computers on without logging off in violation of numerous privacy regulations by adding biometric technology to the remote work station. The digital revolution created a need for an enhanced work environment even before the pandemic, but an agile workforce equipped with more robust security and privacy solutions is now expected. Biometric technology plays a critical role in more quickly securing the workplace digitally and physically. Instead of relying primarily or solely on password protection, biometric technology in the form of fingerprints, facial recognition, retinal scanning or voice recognition devices offers a quick and convenient log-in procedure. Typically, biometric technology uses an individual's biological characteristics to verify whether they are who they say they are, which prevents hacking and other forms of security threats to an individual's accounts, profiles, etc. Because certain biological characteristics do not change with time and difficult to replicate, authentication errors are prevented.

In one particular embodiment, a fingerprint scanner 120 is connected (either directly or indirectly) to each device. The fingerprint scanner 120 prevents unauthorized users access to the system, by requiring a fingerprint scan before access to the system is granted. The fingerprint scanner 120 ensures that only the authorized user/employee can log into the system. In use, the employee/end user must place their finger on the scanner 120 to read the print. If the print matches the scan on file, then access is permitted. If the print does not match the scan on file, then access is denied. Consequently, the fingerprint scanner 120 associated with each device provides an additional level of security to the employer while their employees work remotely.

The system also may offer Aruba network access devices with each unit that provide wireless access points for simple, fast and secure connectivity. Of course, the system is not limited to Aruba and may be used with similar access devices. These access points may be automatically configured so employees may simply plug them into any existing internet connection and they will experience the "in-office" experience while working remotely. Advantageously, these devices extend the corporate office environment and all its authentication and security policies to the home-based employee through a simple Internet connection provided by the employee's cable television or phone system provider.

In use, the system is designed to improve at least four key areas of the dispersed workforce: (1) enhanced security; (2) professional (and consistent) office setting; (3) promote office efficiency; and (4) promote cost efficiency.

Initially, the system utilizes the best technology to minimize security threats associated with a dispersed workforce. As a result, high ranking or "C" level executives of the employer that had little or no solution for security breaches since off-site locations cannot be easily controlled by corporations have greater peace of mind.

Turning to the professional office look and feel offered by the system, it had previously been relatively easy to tell if someone was working from home during video conference calls and other virtual meetings, i.e., Zoom calls and Teams meetings, which can negatively impact the company's image. With the equipment and technology provided by the presently-disclosed system, workers may work remotely in home environments that has the complete look and feel of a corporate office environment. Moreover, the system provides uniformity to all the employees working remotely within the same company as each remote work station can look nearly identical to promote consistency.

In addition, OaaS bundles all the necessary components of what an employee needs to complete their work tasks in an office setting and sends it and the employee home to provide greater efficiency than ever before. Although the virtual office setting has steadily become more widely used over the years, COVID-19 accelerated the pace. This trend is expected to continue as one estimate predicts 40-50% of the workforce in America will continue to work from home. The system provides the necessary tools and equipment to allow remote workers to complete their tasks as if they were in the office, while minimizing security risks.

Finally, OaaS is not only cost effective, but it is also the first OaaS offered as an entire home office package in a subscription-based model. The financial arrangement in a subscription offers the following advantages to corporate entities utilizing a dispersed workforce. Specifically, capital is conserved as there are no upfront purchases. Furthermore, real estate costs are conserved, which can be quite extensive as the average workspace in a corporate office ranges anywhere from 24 to 200 square feet. The system eliminates the cost associated with housing a corporate employee in an office environment, including rental space, insurance, parking fees or ancillary items such as break area space, coffee or refreshment costs, office supplies and other nominal monthly expenses.

Importantly, subscription-based services are considered to be an "expense" item on the company's accounting ledger just as cell phone expenses. Consequently, any profits the company reports as income can be offset with expenses of an OaaS type of service. Another advantage is there is no need to track company assets. Since the corporate entity, i.e., the customer of the services does not own the asset, there is no need to track those assets for depreciation purposes. IRS Section 263 (a) states that a company must capitalize "tangible" property when companies buy any asset their end users utilize. Pursuant to IRS Section 162, the system does not fall under the IRS guidelines for "tangible property."

Finally, the system may include insurance on all components for a fixed period of time, such as three (3) years, eliminating that additional expense for corporations. Another example of cost avoidance relates to the full-time (24×7) technical support and monitoring for the entire offering. This eliminates the need for a company to hire, train and pay benefits to help desk technicians. Importantly, all of these features may be customizable depending on the employer's needs, priorities, and policies.

The foregoing descriptions of various embodiments have been presented for purposes of illustration and description. These descriptions are not intended to be exhaustive or to limit the invention to the precise forms disclosed. The embodiments described provide the best illustration of the inventive principles and their practical applications to thereby enable one of ordinary skill in the art to utilize the disclosure in various embodiments and with various modifications as are suited to the particular use contemplated.

What is claimed is:

1. A computer implemented method comprising operations stored on a non-transitory computer-readable storage medium and executed on a computing device having a processor and a memory for authentication of an Office as a Subscription (OaaS) service, comprising:
providing the computing device with a zero or thin client technology unit;
receiving a request from a user via the computing device for accessing the OaaS service from a server via an existing network;
verifying one or more access credential requirements associated with the user;
upon successful verification, providing the user remote access to the OaaS service from the server;
allowing the user to manipulate data in the OaaS service;
storing the manipulated data in the server; and
preventing, by the zero or thin client technology unit, any capturing, downloading or saving of the data from the OaaS service and any capturing, downloading or saving of the manipulated data from the server.

2. The method of claim 1, wherein the server is a remote server.

3. The method of claim 2, wherein the remote server is positioned behind a firewall or other secured data center.

4. The method of claim 1, wherein the existing network is a cloud-based network.

5. The method of claim 1, wherein the one or more access credential requirements includes utilizing a biometric technology screening process.

6. The method of claim 5, wherein the biometric technology screening process is a fingerprint scan.

7. A computer implemented method for securely allowing one or more end users remote access to a server, comprising:
receiving, at a cloud-based network system, from a first device associated with the one or more end users, a request for access to the server for accessing an OaaS service from the server, the first device provided with a zero or thin client technology unit;
verifying one or more attributes of the one or more end users;
after successful verification, accessing data at the server;
processing of the data at the server;
providing an output of information related to the processed data to the first device; and
preventing, by the zero or thin client technology unit, any capturing, downloading or saving of the data accessed from the server and any capturing, downloading or saving of the processed data from the server.

8. The method of claim 7, further including the step of storing the output of information at the cloud-based network system.

9. The method of claim 7, viewing, at the first device, the output of information related to the processed data.

10. The method of claim 7, wherein the verifying step includes providing a fingerprint scanner to the first device to confirm an identity of the one or more end users.

11. A system configured to allow an end user to work remotely, comprising:
a host server connected to a cloud-based network for executing an Office as a Subscription (OaaS) service; and
a computing device having a processor and a memory for authentication of the OaaS service, the computing device provided with a zero or thin client technology unit, wherein the OaaS service is configured to:
(i) establish a secure connection between the first computing device and the host server,
(ii) access data at the host server;
(iii) allow processing of the data solely at the host server;
(iv) provide an output of information related to the processed data to the computing device; and
(v) prevent, by the zero or thin client technology unit, any capturing, downloading or saving of the data accessed and processed by the computing device from the host server.

12. The system of claim 11, wherein the computing device includes a biometric technology screening process to confirm an identity of the at least one end user.

13. The system of claim 11, wherein the computing device includes at least one noise-cancelling element.

14. The system of claim 13, wherein the at least one noise-cancelling element is a software patch configured to be added to a microphone of the computing device.

15. The system of claim 14, wherein the at least one noise-cancelling element is an external port replicator having noise cancelling technology embedded therein.

16. The system of claim 11, further comprising a storage area network (SAN) for saving any modifications to the processed data.

* * * * *

UNITED STATES PATENT AND TRADEMARK OFFICE
CERTIFICATE OF CORRECTION

PATENT NO. : 12,335,258 B2  
APPLICATION NO. : 17/890826  
DATED : June 17, 2025  
INVENTOR(S) : John D. Lee Page 1 of 1

It is certified that error appears in the above-identified patent and that said Letters Patent is hereby corrected as shown below:

In the Claims

Claim 11, Column 10, Line 54, delete "first"

Signed and Sealed this  
Twenty-second Day of July, 2025

Coke Morgan Stewart  
*Acting Director of the United States Patent and Trademark Office*